UNITED STATES PATENT OFFICE 2,606,161

STYRENE-ALKYD RESIN COPOLYMER

Paul E. Marling, Dayton, Ohio, assignor to Monsanto Chemical Company, St. Louis, Mo., a corporation of Delaware No Drawing. Application November 24, 1948, Serial No. 61,910

12 Claims. (Cl. 260—22)

This invention relates to improved coating compositions readily prepared from inexpensive and abundantly available raw materials. More particularly the invention relates to self-drying, film-forming compositions prepared from styrene and unsaturated alkyd resins.

The paint and varnish industry has been seeking to adapt styrene to coating composition uses because of its low cost and general availability. Because polystyrene is not compatible with conventional film-forming materials, the utilization of styrene has been difficult to accomplish. The incompatibility of polystyrene and drying oils causes low film strength, increases the susceptibility of the film to water and alkali, and induces the formation of opaque coatings. Although transparent copolymers of styrene and unsaturated alkyd resins have been prepared, the resulting films are soluble in many common organic solvents, are too thermoplastic for many applications, and lack durability under normal weathering conditions. These copolymers are known to the coating composition industry as "styrenated alkyd resins."

The primary purpose of this invention is to provide a simple and readily reproducible method of preparing copolymers of styrene and unsaturated alkyd resins. A further purpose of this invention is to provide copolymers of styrene and alkyd resins which have unusual solvent and thermal resistance, and excellent all-purpose utility.

Conventional unsaturated alkyd resins are cross-linked linear polyesters, the various components of which are unsaturated monocarboxylic acid, polyhydric alcohols, and polycarboxylic acids. The various components are so selected and proportioned so as to prepare high molecular weight condensation products with a minimum acid number. In general, the components are so selected that there are approximately the same number of available hydroxyl radicals and available carboxyl radicals in the reaction mass. The molecular weight of the condensation products may be determined to some extent by the proportion of monofunctional components, such as the unsaturated monocarboxylic acids, and the number of polyfunctional components, for example the polyhydric alcohols and the polycarboxylic acids. The polyfunctional components promote the long chain molecules, whereas the monofunctional components terminate the polyester chains and therefore encourage the formation of low molecular weight polymers.

In accordance with this invention it has been discovered that unusually desirable copolymers of styrene and unsaturated alkyd resins are prepared from alkyd resins which have incorporated substantial proportions of one or more aromatic monocarboxylic acids. The aromatic acid enters the alkyd polymer reaction and every molecule terminates a linear polymer chain. By varying the proportion of the aromatic monocarboxylic acid, adjustment of the molecular weight of the alkyd resin is possible, but in all cases it will be lower than that of a similar polymer made without the monocarboxylic acid. Suitable aromatic monocarboxylic acids are benzoic acid, and alkyl substituted benzoic acids, wherein from one to three alkyl substituents, each of one to three carbon atoms in length may be present, for example toluic acid and 3,5-dimethyl benzoic acid.

The alkyd resins have as their polymerizable radicals those derived from various drying oils, such as tung oil, soy bean oil, linseed oil, dehydrated castor oil, isomerized linseed oil, oiticia oil, and other drying and semi-drying oils which are triglycerides of predominantly ethylenic unsaturated monocarboxylic acids, such as oleic acid, linoleic acid, linolenic acid, eleostearic acid, and geranic acid. The aforementioned ethylenic unsaturated monocarboxylic acids have from about 10 to about 20 carbon atoms. The drying oil acids are condensed with polyhydric alcohols having at least three hydroxyl radicals and with dicarboxylic acids. Suitable polyhydroxy alcohols are glycerol, erythritol, pentaerythritol, sorbitol and mannitol. Suitable dicarboxylic acids are phthalic acid, maleic acid, succinic acid, fumaric acid, adipic acid, itaconic acid, the anhydrides of various cis-dicarboxylic acids and other polycarboxylic acids. In addition to the above described conventional alkyd resin components a substantial proportion of aromatic monocarboxylic acid is added thereto, for example benzoic acid and toluic acid.

The proportions of the various alkyd resin components which are useful in the practice of this invention may be conveniently described with respect to the percentages of each acidic component based upon the equivalence to the polyhydric alcohol present. It is generally desired to have approximately the stoichiometric equivalent to the polyhydroxy alcohol of carboxylic acid radicals in the alkyd resin. In other words it is desired to have approximately a zero acid number in the alkyd resin. As is well known in the art it is actually necessary to charge an excess of the polyhydric alcohol in order to obtain a product of low acid value. Accordingly an excess of the polyhydric alcohol can be employed. The carboxylic acid groups present are calculated on the basis of the equivalent hydroxyl groups without including the excess polyhydric alcohol. Thus, the aromatic monocarboxylic acid should be used in the amount of from 35 to 81 percent of the amount equivalent to the hydroxyl radical of the polyhydric alcohol. The dicarboxylic acid should be used in an amount of from 1 to 7 percent of the amount equivalent to the polyhydric alcohol. For best results the ethylenic unsaturated monocarboxylic acid should be between 12 and 60 percent of the amount equivalent to the polyhydroxy compound, and when mixed acids of this class are employed a substantial portion of the mixed acids must be drying oil acids which contain at least two ethylenic bonds. Accordingly, the term "ethylenic unsaturated monocarboxylic drying oil acid" is understood to include the monoethylenic monocarboxylic acids and minor amounts of saturated monocarboxylic acids present in natural drying and semi-drying oils. In the appended specification and claims these percentages are termed "percent equivalent."

The unsaturated alkyd resins may be prepared by mixing the desired proportion of at least one of each of the above described components, ethylenic unsaturated monocarboxylic acid, polyhydroxy alcohol, dicarboxylic acid and aromatic monocarboxylic acid. The reactants are mixed and heated to a temperature between 200 and 500° F. to effect a condensation. This condensation is an esterification procedure and if desired conventional esterification catalysts, such as sulfuric acid and p-toluene sulfonic acid may be used. Conventional apparatus may be used, for example retorts provided with water cooled reflux condensers adapted to remove the water from the condensate continuously throughout the reaction.

An alternative method of preparing the alkyd resins involves the use of drying oils which are heated with glycerol or other polyhydroxy alcohol in suitable proportions for converting the triglyceride to the monoglyceride, or the monoesters of the other polyhydroxy alcohol if one is used. The mixture of esters so obtained will have a substantial excess of available hydroxyl radicals which must be reacted with additional carboxylic acids. Accordingly, the reaction is continued by the addition of dicarboxylic acids and monocarboxylic acid in selected proportions.

The unsaturated alkyd resins prepared in accordance with the preceding paragraphs are then copolymerized with styrene and with α-methyl substituted styrene, such as α-methyl styrene, isopropenylbiphenyl, and α-para-dimethyl styrene. The preferred composition comprises from about 25 to about 75 per cent of the unsaturated alkyd resin, from about 15 to about 50 per cent styrene, and from about 10 to about 25 per cent of a compound from the class consisting of α-methylstyrene, isopropenylbiphenyl and α-p-dimethylstyrene, all by weight per cent. The copolymerization is effected by mixing styrenes with a suitable polymerization catalyst and heating at a temperature between 200 and 500° F. for a period of time sufficient to complete the copolymerization. Suitable catalysts for effecting this polymerization are the peroxides which are soluble in the reactants of the polymerizing mixture, such as benzoyl peroxide, acetyl peroxide, tetra-butyl hydroperoxide, isopropyl percarbonate, hydrogen peroxide, and other compounds containing a peroxy group, which are soluble in the polymerizing mass. The extent of polymerization may be estimated by viscosity measurements.

The solid or viscous liquid copolymer of styrene and/or other vinyl or isopropenyl aromatic hydrocarbon is dissolved in a suitable solvent and in such solution form used as a coating composition. Suitable solvents for dissolving the new styrenated alkyd resins are turpentine, mineral spirits, xylene, benzene, and other similar solvents. The coating composition may be comprised of from 10 to 90 percent by weight of the solvent.

The coating compositions may in addition be compounded with other conventional paint and varnish components. If desired the coating compositions may be blended with drying oils, such as linseed oil, soy bean oil, and tung oil, synthetic resins, such as phenolic resins, and other resins both natural and synthetic, metallic driers, for example the various carboxylic acid salts of cobalt, lead and manganese, particularly the naphtenates, and pigments, for example white lead, iron oxide, lithopone and lead chromate. The film-forming compositions may be used on wood, metal, cloth, paper, leather, and may be applied by brushing, dipping, spraying, or other conventional technique.

Further details in the preparation and use of the new coating compositions are set forth with respect to the following specific examples.

*Example 1*

A suitable reaction flask was charged with 122 parts by weight of a mixture of 95 percent benzoic acid and 5 percent phthalic anhydride, 50 parts of 98 percent glycerine and 40 parts of the fatty acids of dehydrated castor oil. While passing a stream of carbon dioxide through the vessel and with vigorous agitation by means of a propeller type stirrer, operating at a peripheral speed of 600 feet per minute, the reaction mass was heated for one hour at 460° F. The resulting product was a pale yellow, clear liquid having an acid number of twelve. Fifty parts by weight of the above described resinous material was charged to a suitable flask and while heating at about 320° F., a mixture of 100 parts by weight of styrene, 40 parts of α-methyl styrene, and 5 parts of benzoyl peroxide were gradually added at a rate which required four hours for the complete combination of reagents, during which time the mixed composition was held at the reflux temperature of the system. Then the temperature was gradually raised to 480° F. in two hours and then the composition was allowed to cool. A liquid resinous composition so obtained was dissolved in an equal volume of xylene.

The product was used to coat metal panels and baked for five minutes at 300° F. A hard film was so produced which was less soluble in xylene and less thermoplastic than the control samples prepared in identical manner but without the use of benzoic acid.

*Example 2*

Using the procedure described in the preceding example 31 grams of 98 percent glycerine, 61 grams of the mixture of 95 percent benzoic acid and 5 percent phthalic anhydride, and 80 parts of the fatty acids of dehydrated castor oil were reacted until the mixture had an acid value of ten. The resulting product was a clear and almost colorless liquid. A 140 gram sample of the alkyd resin so prepared was charged to a reaction flask and a mixture of 100 grams of styrene, 40 grams of α-methyl styrene and 5 grams of benzoyl peroxide was added thereto dropwise over a period of five hours at reflux temperature. The temperature was then raised gradually to 460° F. over a nine hour period. The resulting copolymer was clear, nearly colorless and completely soluble in xylene. The resin was dissolved in petroleum spirit to form a useful coating composition.

Glass panels were then coated with the resinous solution and cured for fifteen minutes at 300° F. The films so obtained were less soluble in xylene and less thermoplastic than comparable films not containing the benzoic acid.

The invention is defined by the following claims.

I claim:

1. A copolymer of 15 to 50 percent by weight styrene, from 10 to 25 percent of a compound of the class consisting of α-methyl styrene, isopropenylbiphenyl and α-p-dimethyl styrene, and 25 to 75 percent of an unsaturated alkyd resin of low acid number prepared by the condensation of a polyhydroxy alcohol having at least three hydroxyl groups and a mixture consisting of from 12 to 60 percent equivalent of an ethylenic unsaturated monocarboxylic drying oil acid having from ten to twenty carbon atoms, from one to seven percent equivalent of a dicarboxylic acid, and from 35 to 81 percent equivalent of an aromatic monocarboxylic acid of the type

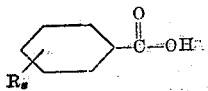

wherein R is an alkyl radical having up to three carbon atoms and $x$ is a small whole number from zero to three, inclusive.

2. A liquid coating composition comprising a 10 to 90 percent by weight solution in a volatile organic solvent of a copolymer of 15 to 50 percent by weight styrene, from 10 to 25 percent of a compound of the class consisting of α-methyl styrene, isopropenylbiphenyl and α-p-dimethyl styrene, and 25 to 75 percent of an unsaturated alkyd resin of low acid number prepared by the condensation of a polyhydroxy alcohol having at least three hydroxyl groups and a mixture consisting of from 12 to 60 percent equivalent of an ethylenic unsaturated monocarboxylic drying oil acid having from ten to twenty carbon atoms, from one to seven percent equivalent of a dicarboxylic acid, and from 35 to 81 percent equivalent of an aromatic monocarboxylic acid of the type

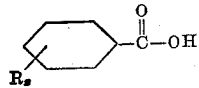

wherein R is an alkyl radical having up to three carbon atoms and $x$ is a small whole number from zero to three, inclusive.

3. A copolymer of 15 to 50 percent by weight styrene, from 10 to 25 percent of a compound of the class consisting of α-methyl styrene, isopropenylbiphenyl and α-p-dimethyl styrene, and 25 to 75 percent of an unsaturated alkyd resin of low acid number prepared by the condensation of a polyhydroxy alcohol having at least three hydroxyl groups and a mixture consisting of from 12 to 60 percent equivalent of an ethylenic unsaturated monocarboxylic drying oil acid having from ten to twenty carbon atoms, from one to seven percent equivalent of a dicarboxylic acid, and from 35 to 81 percent equivalent of benzoic acid.

4. A liquid coating composition comprising a 10 to 90 percent by weight solution of a volatile organic solvent of a copolymer of 15 to 50 percent by weight styrene, from 10 to 25 percent of a compound of the class consisting of α-methyl styrene, isopropenylbiphenyl and α-p-dimethyl styrene, and 25 to 75 percent of an unsaturated alkyd resin of low acid number prepared by the condensation of a polyhydroxy alcohol having at least three hydroxyl groups and a mixture consisting of from 12 to 60 percent equivalent of an ethylenic unsaturated monocarboxylic drying oil acid having from ten to twenty carbon atoms, from one to seven percent equivalent of a dicarboxylic acid, and from 35 to 81 percent equivalent of benzoic acid.

5. A copolymer of 15 to 50 percent by weight styrene, from 10 to 25 percent of a compound of the class consisting of α-methyl styrene, isopropenylbiphenyl and α-p-dimethyl styrene, and 25 to 75 percent of an unsaturated alkyd resin of low acid number prepared by the condensation of a polyhydroxy alcohol having at least three hydroxyl groups and a mixture consisting of from 12 to 60 percent equivalent of dehydrated castor oil acids, from one to seven percent equivalent of a dicarboxylic acid, and from 35 to 81 percent equivalent of an aromatic monocarboxylic acid of the type

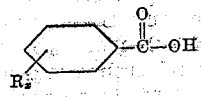

wherein R is an alkyl radical having up to three carbon atoms and $x$ is a small whole number from zero to three, inclusive.

6. A liquid coating composition comprising a 10 to 90 percent by weight solution in a volatile organic solvent of a copolymer of 15 to 50 percent by weight styrene, from 10 to 25 percent of a compound of the class consisting of α-methyl styrene, isopropenylbiphenyl and α-p-dimethyl styrene, and 25 to 75 percent of an unsaturated alkyd resin of low acid number prepared by the condensation of a polyhydroxy alcohol having at least three hydroxyl groups and a mixture consisting of from 12 to 60 percent equivalent of dehydrated castor oil acids, from one to seven percent equivalent of a dicarboxylic acid, and from 35 to 81 percent equivalent of an aromatic monocarboxylic acid of the type

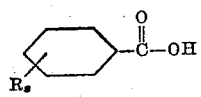

wherein R is an alkyl radical having up to three carbon atoms and $x$ is a small whole number from zero to three, inclusive.

7. A copolymer of 15 to 50 percent by weight styrene, from 10 to 25 percent of a compound of the class consisting of α-methyl styrene, isopropenylbiphenyl, and α-p-dimethyl styrene, and 25 to 75 percent of an unsaturated alkyd resin of low acid number prepared by the condensation of a polyhydroxy alcohol having at least three hydroxyl groups and a mixture consisting of from 12 to 60 percent equivalent of dehydrated castor oil acids, from one to seven percent equivalent of phthalic acid, and from 35 to 81 percent equivalent of benzoic acid.

8. A liquid coating composition comprising a 10 to 90 percent by weight solution in a volatile organic solvent of a copolymer of 15 to 50 percent by weight styrene, from 10 to 25 percent of a compound of the class consisting of α-methyl styrene, isopropenylbiphenyl and α-p-dimethyl styrene, and 25 to 75 percent of an unsaturated alkyd resin of low acid number prepared by the condensation of a polyhydroxy alcohol having at least three hydroxyl groups and a mixture consisting of from 12 to 60 percent equivalent of dehydrated castor oil acids, from one to seven percent equivalent of phthalic acid, and from 35 to 81 percent equivalent of benzoic acid.

9. A copolymer of 15 to 50 percent by weight styrene, from 10 to 25 percent of a compound of the class consisting of α-methyl styrene, isopropenylbiphenyl, and α-p-dimethyl styrene, and 25 to 75 percent of an unsaturated alkyd resin of low acid number prepared by the condensation of a polyhydroxy alcohol having at least three hydroxyl groups and a mixture consisting of from 12 to 60 percent equivalent of linseed oil acids, from one to seven percent equivalent of phthalic acid, and from 35 to 81 percent equivalent of benzoic acid.

10. A liquid coating composition comprising a 10 to 90 percent by weight solution in a volatile organic solvent of a copolymer of 15 to 50 percent by weight styrene, from 10 to 25 percent of a compound of the class consisting of α-methyl styrene, isopropenylbiphenyl and α-p-dimethyl styrene, and 25 to 75 percent of an unsaturated alkyd resin of low acid number prepared by the condensation of a polyhydroxy alcohol having at least three hydroxyl groups and a mixture consisting of from 12 to 60 percent equivalent of linseed oil acids, from one to seven percent equivalent of phthalic acid, and from 35 to 81 percent equivalent of benzoic acid.

11. A copolymer of 15 to 50 percent by weight styrene, from 10 to 25 percent of a compound of the class consisting of α-methyl styrene, isopropenylbiphenyl and α-p-dimethyl styrene, and 25 to 75 percent of an unsaturated alkyd resin of low acid number prepared by the condensation of a polyhydroxy alcohol having at least three hydroxyl groups and a mixture consisting of from 12 to 60 percent equivalent of dehydrated castor oil acids, from one to seven percent equivalent of phthalic acid, and from 35 to 81 percent equivalent of toluic acid.

12. A liquid coating composition comprising a 10 to 90 percent by weight solution in a volatile organic solvent of a copolymer of 15 to 50 percent by weight styrene, from 10 to 25 percent of a compound of the class consisting of α-methyl styrene, isopropenylbiphenyl and α-p-dimethyl styrene, and 25 to 75 percent of an unsaturated alkyd resin of low acid number prepared by the condensation of a polyhydroxy alcohol having at least three hydroxyl groups and a mixture consisting of from 12 to 60 percent equivalent of dehydrated castor oil acids, from one to seven percent equivalent of phthalic acid, and from 35 to 81 percent equivalent of toluic acid.

PAUL E. MARLING.

REFERENCES CITED

The following references are of record in the file of this patent:

UNITED STATES PATENTS

| Number | Name | Date |
| --- | --- | --- |
| 2,025,642 | Brubaker | Dec. 24, 1935 |
| 2,352,810 | Swain | July 4, 1944 |
| 2,392,710 | Wakeford et al. | Jan. 8, 1946 |
| 2,407,479 | D'Alelio | Sept. 10, 1946 |
| 2,468,748 | Griess et al. | May 3, 1949 |